United States Patent Office 3,210,284
Patented Oct. 5, 1965

3,210,284
STABILIZATION OF ALKALINE POTASSIUM PERMANGANATE SOLUTIONS
Jacque L. Duvall, West Covina, Calif., assignor to Wyandotte Chemicals Corporation, Wyandotte, Mich., a corporation of Michigan
No Drawing. Filed Mar. 23, 1962, Ser. No. 182,099
5 Claims. (Cl. 252—80)

This invention relates to the stabilization of alkaline permanganate solutions against the decomposition of such solutions during storage.

Alkaline permanganate solutions are widely used for cleaning purposes. More specifically, alkaline permanganate solutions are employed to remove radioactive elements from metal surfaces and to remove high temperature oxides or heat scale from metal surfaces, particularly jet engines. This heat scale which is formed on components of jet engines or other types of engines operating at high temperatures under oxidizing conditions is a scale of oxide character which is deposited because of the high temperature oxidizing conditions. This heat scale is much more refractory than ordinary rust and difficult to remove by ordinary cleaning substances including alkaline reagents. Alkaline permanganate solutions are very effective for removing materials such as heat scale from jet engines and for removing radioactive elements from metal surfaces. In general, aqueous solutions having an alkali metal hydroxide concentration of from about 1 to 10 normal and an alkali metal permanganate concentration ranging from about 0.02 to 1.0 molar are preferred for such applications and potassium permanganate and either sodium hydroxide or potassium hydroxide are the preferred ingredients although sodium permanganate solutions are also useful. Other alkaline permanganate solutions have also been found effective for various cleaning uses.

Alkaline permanganate solutions have certain inherent defects due to decomposition upon storage for any appreciable period of time. Solutions of alkali metal permanganates dissolved in alkali metal hydroxides contain permanganate and hydroxyl ions. The permanganate, i.e. $MnO_4^-$, ions in such solutions tend to be reduced in the presence of the hydroxyl, i.e. $OH^-$, ions to form manganate, i.e. $MnO_4^{--}$, ions. The further this reaction proceeds in reducing permanganate ions to manganate ions, the less effective the solution becomes as a cleaning solution. Thus, the solutions must be made up fresh for each use if their cleaning effectiveness is to be retained. In some instances, the cleaning process time required to produce the desired degree of cleanliness exceeds the time during which complete decomposition occurs.

Accordingly, it is the purpose of this invention to stabilize alkaline permanganate solutions to permit storage for substantial periods of time wherein decomposition and resulting decreased effectiveness of the solution is eliminated or substantially reduced.

In accordance with the principles embodying this invention, alkaline permanganate solutions are stabilized against decomposition by removing any manganate ions present in the solution. As pointed out above, manganate ions are formed by the decomposition reaction. The removal of such manganate ions has been discovered to effectively block the decomposition whereby the alkaline permanganate solution is stable and may be stored for long periods of time without appreciable reduction in the effectiveness of the solution. The manganate ions may be removed by treating the alkaline permanganate solution with a substance which quantitatively precipitates manganate ions and does not precipitate permanganate ions, i.e. a substance which forms a soluble permanganate compound and an insoluble manganate compound.

For storage at normal room temperatures, i.e. about 25° C., it is preferred in accordance with the principles embodying this invention to treat such solutions with a cation selected from the group consisting of barium, calcium and strontium cations. However, where it is necessary to store the solution at elevated temperatures, for example 50° C. or higher, only barium has been found to be effective since the solubilities of calcium and strontium in the hydroxide form are limited at elevated temperatures. While the solubility of barium manganate tends to increase at elevated temperatures, suppression of this phenomenon may be obtained through increased common ion effect by employing larger amounts of barium cation at elevated temperatures to maintain the barium function at its maximum efficiency level. At any temperature, the important thing is that the manganate ion be as nearly quantitatively removed as possible and if this is done permanganate decomposition is blocked or substantially suppressed.

In general, the alkaline permanganate solution is treated with a compound of a metal selected from the group consisting of barium, calcium and strontium. The nature of the anion in the compound is not too important as long as it does not hinder dissolving of the cation. The oxides, hydroxides or salts of barium, calcium or strontium that will dissolve to a reasonable extent in the alkaline permanganate solution are suitable for this treatment. Preferred salts for this purpose are the chlorides and nitrates. Depending upon the original chemical purity of the permanganate solution, just slightly more than a trace of the barium, calcium or strontium cation is sufficient to permit storage of a very pure, fresh solution containing a trace of the manganate ion. That is to say, if the original permanganate solution is sufficiently pure to contain only a trace of manganate ion then a trace of calcium, strontium or barium cation is sufficient to precipitate the manganate ion and stabilize the solution. Accordingly, the amount of barium, calcium or strontium cation required is equal to and preferably somewhat greater than the amount necessary to react completely with the amount of manganate ion present in the solution at the time of the addition of the cation. The barium, calcium or strontium cations are usable at any concentration greater than the above minimums without any necessary maximum other than determined by economic considerations such as the cost of the material. In general, the practical maximum or minimum concentration in use depends on the particular application for the permanganate solution and the desired objectives to be accomplished. Where subsequent additions of reducing agents are to be expected, a practical minimum would be about 5 mol percent of the original permanganate ion concentration. For practical purposes, the maximum amount of such cation would be about 200 mol percent of the amount of permanganate ion in the original solution.

The following examples illustrate the principles of this invention.

EXAMPLE I 500 milliliters of a 6.49 normal sodium hydroxide, 0.04 molar potassium permanganate aqueous solution was prepared in a 600 milliliter glass beaker. Two 200 milliliter portions of the solution were placed in 250 milliliter conical glass flasks. One portion of the solution was treated with 3.9 grams of barium chloride and stirred to produce a 0.08 molar barium cation concentration in the solution, thus providing an amount of barium cation of 200 mol percent of the amount of permanganate ion in the original solution. The other portion of the original solution received no treatment. Both portions were stored at 25° C. with the containers closed by watch glasses except when analytical samples were taken. Each portion of the solution was analyzed at the beginning of the test run and at the time intervals indicated in Table I below for permanganate content. The results of these analyses are shown in Table I. The analysis for permanganate was carried out by the following method.

A 10 milliliter aliquot of the alkaline permanganate solution is added to a 200 milliliter glass beaker containing 50 milliliters of distilled water and 10 milliliters of 30% $BaCl_2 \cdot 2H_2O$ solution at room temperature. This is quickly titrated with standard sodium thiosulfate solution, while stirring constantly, to a potentiometric endpoint using a bright platinum indicating electrode and saturated calomel reference electrode. The indicating instrument employed was a Beckman Model G pH meter. The molar concentration of the permanganate solution is then calculated.

Table I
$KMnO_4$ CONCENTRATION VS. REACTION TIME

| Time (minutes) | Untreated solution, $\times 10^{-3}$ molar | Solution treated with $BaCl_2$, $\times 10^{-3}$ molar |
| --- | --- | --- |
| 0 | 34.67 | 40.5 |
| 15 | 30.54 | 41.0 |
| 30 | 27.00 | 41.2 |
| 45 | 23.88 | 43.0 |
| 60 | 22.96 | 41.0 |
| 75 | 20.80 | --- |
| 90 | 20.43 | 40.3 |
| 105 | 19.06 | --- |
| 120 | 18.37 | 38.7 |
| 150 | --- | 39.4 |
| 180 | --- | 38.7 |
| 19 hours | 5.69 | 33.2 |

From the above table it can be seen that even after 19 hours the potassium permanganate concentration of the solution which was treated with barium chloride was still relatively high, i.e. $33.2 \times 10^{-3}$ molar whereas the portion of the solution which was not treated had a very low permanganate concentration of $5.69 \times 10^{-3}$ molar, clearly demonstrating the effectiveness of the treatment of this invention.

EXAMPLE II 500 milliliters of a 7.95 normal sodium hydroxide, 0.02 molar potassium permanganate aqueous solution was prepared in a 600 milliliter glass beaker. The solution was divided into two portions of 200 milliliters each and placed in 250 milliliter conical glass flasks. One portion of the solution was treated with 2.0 grams of barium chloride and stirred to produce a 0.04 molar barium cation concentration in the solution, thus providing an amount of barium cation of 200 mol percent of the amount of permanganate ion in the original solution. The other portion of the original solution received no treatment. Both portions were stored at 50° C. with the containers closed by a watch glass, except when analytical samples were taken. Each portion of the solution was analyzed at the beginning of the test run and at the time intervals indicated in Table II below for permanganate content. The results of these analyses are shown in Table II. The analysis for permanganate was carried out by the same method as for Example I.

Table II

| Time (minutes) | Untreated solution, $\times 10^{-3}$ molar | Solution treated with $BaCl_2$, $\times 10^{-3}$ molar |
| --- | --- | --- |
| 0 | 17.3 | 17.3 |
| 15 | --- | 16.4 |
| 30 | --- | 15.1 |
| 45 | --- | 14.5 |
| 60 | [1] 0.0 | 13.8 |
| 120 | --- | 11.4 |
| 180 | --- | 9.8 |
| 240 | --- | 8.3 |
| 300 | --- | [2] 7.1 |

[1] 100% decomposed.
[2] 59% decomposed.

From the above results, it can be seen that the untreated solution was 100% decomposed at the end of one hour, whereas the treated solution was only 59% decomposed even after five hours, thus demonstrating the effectiveness of the treatment of this invention even at elevated temperatures.

EXAMPLE III 100 milliliters of a 4.5 normal sodium hydroxide, 0.0001 molar potassium permanganate aqueous solution was prepared in a 250 milliliter conical glass flask. The solution was divided into two portions of 50 milliliters each and placed in glass test tubes. One portion of the solution was treated with 0.15 gram of barium chloride and stirred to produce a 0.01 molar barium cation concentration in the solution, thus providing an amount of barium cation of 100 times the amount of permanganate ion in the original solution. The other portion of the original solution received no treatment. Both solutions were stored in open glass colorimeter tubes at 25° C. Each portion of the solution was tested for permanganate concentration at the time intervals indicated in Table III below.

Changes in permanganate concentration were determined optically by a change in the percent transmission of 530 mu wave length light. A 4.5 normal aqueous sodium hydroxide solution was used as a standard for 100% transmittance. A B & L Spectronic 20 spectrophotometer was employed as the measuring device.

Table III

| Time (minutes) | Untreated solution, percent | Solution Treated with $BaCl_2$, percent |
| --- | --- | --- |
| 0 | 3.5 | 3.0 |
| 10 | --- | 3.5 |
| 20 | --- | 3.5 |
| 30 | --- | 3.5 |
| 40 | --- | 3.5 |
| 50 | --- | 3.5 |
| 60 | 100 | 4.0 |
| 80 | --- | 4.0 |
| 100 | --- | 4.5 |
| 120 | --- | 4.5 |
| 180 | --- | 5.0 |
| 240 | --- | 6.0 |
| 300 | --- | 7.0 |
| 23 hours | --- | 13.0 |

From the above table, it can be seen that even after 23 hours the transmittance for the treated portion of the potassium permanganate solution was only 13%, indicating a permanganate solution possessing substantially unchanged strength. On the other hand, the strength of the untreated portion of the solution had decreased to the point where 100% transmittance was obtained after only one hour, thus demonstrating the effectiveness of the treatment of this invention. The color of the solution was also observed visually. Both portions of the solution initially possessed the purple color characteristic of permanganate solutions. However, the purple color disappeared from the untreated solution after one hour, whereas the treated solution retained the purple color even after the passage of a week.

EXAMPLE IV

Nine 500 milliliter aqueous alkaline permanganate solutions having the compositions indicated in Table IV below were prepared in glass bottles. Each permanganate solution was treated with the barium, calcium or strontium compound indicated in Table IV and stirred to produce a solution having the concentration indicated in Table IV. The solutions were stored at 25° C. with the containers closed by glass stoppers and observed after the passage of three days. All the solutions had retained their characteristic strong purple color even after storage at 25° C. for three days, indicating the presence of substantial amounts of permanganate ion.

Table IV

| Solution No. | $MnO_4^-$ | Initial molar concentration | Hydroxide | Initial molar concentration | Treating agent | Amount added, gms./liter | Molar concentration of treated solution |
|---|---|---|---|---|---|---|---|
| 1 | $KMnO_4$ | 0.3 | NaOH | 1.0 | $BaCl_2$ | 3.2 | 0.015 |
| 2 | $KMnO_4$ | 0.2 | KOH | 1.0 | $BaCl_2$ | 42.0 | 0.2 |
| 3 | $KMnO_4$ | 0.2 | NaOH | 3.0 | $Ba(NO_3)_2$ | 5.2 | 0.02 |
| 4 | $KMnO_4$ | 0.2 | NaOH | 3.0 | BaO | 3.1 | 0.02 |
| 5 | $KMnO_4$ | 0.2 | NaOH | 3.0 | $Ba(OH)_2$ | 3.4 | 0.02 |
| 6 | $KMnO_4$ | 0.2 | NaOH | 3.0 | $CaCl_2$ | 2.2 | 0.02 |
| 7 | $KMnO_4$ | 0.2 | KOH | 3.0 | $Ca(NO_3)_2$ | 3.3 | 0.02 |
| 8 | $KMnO_4$ | 0.2 | KOH | 3.0 | $SrCl_2$ | 3.2 | 0.02 |
| 9 | $KMnO_4$ | 0.2 | NaOH | 3.0 | $Sr(OH)_2$ | 2.4 | 0.02 |

Additional examples of suitable solutions embodying the principles of this invention are illustrated in Table V below.

Table V

| Solution No. | $MnO_4^-$ | Initial molar concentration | Hydroxide | Initial molar concentration | Treating agent | Amount added, gms./liter | Molar concentration of treated solution |
|---|---|---|---|---|---|---|---|
| 1 | $NaMnO_4$ | 1.0 | NaOH | 1.0 | $BaCl_2$ | 21.0 | 0.1 |
| 2 | $NaMnO_4$ | 0.2 | KOH | 3.0 | $BaCl_2$ | 4.2 | 0.02 |
| 3 | $NaMnO_4$ | 0.2 | KOH | 3.0 | $CaCl_2$ | 2.2 | 0.02 |
| 4 | $NaMnO_4$ | 0.2 | NaOH | 3.0 | $SrCl_2$ | 3.2 | 0.02 |

While there has been shown and described hereinabove the present preferred embodiments of this invention, it is to be understood that various changes, alterations and modifications can be made thereto without departing from the spirit and scope thereof as defined in the appended claims.

I claim:

1. A method of stabilizing alkaline solutions of permanganates selected from the group consisting of sodium permanganate and potassium permanganate against decomposition comprising removing manganate ions present in the solution by combining said manganate ions with cations selected from the group consisting of barium, calcium, and strontium cations.

2. The method of claim 1 wherein said cations are barium cations.

3. The method of claim 1 wherein said cations are calcium cations.

4. The method of claim 1 wherein said cations are strontium cations.

5. A method of stabilizing against decomposition an aqueous solution of permanganates selected from the group consisting of sodium permanganate and potassium permanganate, and hydroxides selected from the group consisting of sodium hydroxide and potassium hydroxide wherein the concentration of said permanganates in said solutions is 0.02 to 1.0 molar and the concentration of said hydroxides in said solutions is 1 to 10 normal comprising removing manganate ions present in said solutions by combining said manganate ions with cations of a metal selected from the group consisting of barium, calcium, and strontium.

References Cited by the Examiner

UNITED STATES PATENTS 1,453,562   5/23   Wilson et al. _____ 23—58
1,592,480   7/26   Wilson et al. _____ 23—58
3,000,829   9/61   Arden _____ 252—80 XR

OTHER REFERENCES

Mellor: "Comprehensive Treatise on Inorganic and Theoretical Chemistry," volume 12, 1932, Green and Co., p. 294.

Ferguson et al.: "Permanganate Decomposition in Alkaline Media," J.A. Chem. Soc. 53, 126–135 (January 1931).

JULIUS GREENWALD, *Primary Examiner.*